United States Patent [19]

Blackwell et al.

[11] Patent Number: 5,049,446
[45] Date of Patent: Sep. 17, 1991

[54] POLY(ARYLENE SULFIDE) COMPOSITION FOR MOLDING ARTICLES

[75] Inventors: Jennings P. Blackwell; William H. Beever, both of Bartlesville, Okla.

[73] Assignee: Phillips Petroleum Company, Bartlesville, Okla.

[21] Appl. No.: 411,759

[22] Filed: Oct. 18, 1989

Related U.S. Application Data

[62] Division of Ser. No. 928,128, Nov. 7, 1986, abandoned.

[51] Int. Cl.$^5$ .............................................. D02G 3/00
[52] U.S. Cl. .................................. 428/364; 428/292; 428/375; 428/394; 524/609; 525/537
[58] Field of Search ...................... 524/609; 525/537; 428/364, 292, 375, 394

[56] References Cited

U.S. PATENT DOCUMENTS

| | | | |
|---|---|---|---|
| 4,021,596 | 5/1977 | Bailey | 428/375 |
| 4,365,037 | 12/1982 | Adachi et al. | 524/449 |
| 4,528,335 | 7/1985 | Selby et al. | 525/420 |
| 4,544,700 | 10/1985 | Wright | 524/543 |
| 4,581,411 | 4/1986 | Liang et al. | 525/189 |

OTHER PUBLICATIONS

Encyclopedia of Polymer Science and Technology, vol. 11, pp. 447-463 (1969).
Shue et al., "Screening Test for PPS Compounds", Plastics Engineering, p. 38 (4-1983).

*Primary Examiner*—Joseph L. Schofer
*Assistant Examiner*—J. M. Reddich
*Attorney, Agent, or Firm*—Richmond, Phillips, Hitchcock & Umphlett

[57] ABSTRACT

A poly(arylene sulfide) composition containing an aromatic sulfone polymer and reinforcing material is provided for molding large articles free of internal cracks. The inventive composition optionally contains a high molecular weight polyphenylene sulfide, a reinforcing material such as glass fibers and a sulfone polymer containing at least one recurring aliphatic group in the polymer chain.

13 Claims, No Drawings

POLY(ARYLENE SULFIDE) COMPOSITION FOR MOLDING ARTICLES

This application is division of co-pending application Ser. No. 928,128, filed Nov. 7, 1987, now abandoned.

THE FIELD OF INVENTION

The invention is related to poly(arylene sulfide) molding compositions. It is further related to fiber-reinforced poly(arylene sulfide) molding compositions. It also is related to poly(arylene sulfide) molded articles having improved crack resistance.

BACKGROUND OF THE INVENTION

Reinforced poly(arylene sulfide) compositions are highly suitable for molding into objects which require strength, high temperature stability and chemical resistance. When glass or carbon-reinforced polyphenylene sulfide is molded into a large thick-walled object, such as a gasoline tank, internal cracking of the walls is sometimes encountered. The problem can be countered somewhat by using high molecular wright, low melt flow rate, linear poly(p-phenylene sulfide). Crack-inhibiting additives such as the ethylene polymers described in U.S. Pat. No. 4,544,700 have been used in reinforced polyphenylene sulfide molding compositions. The problem of internal cracking in thick-walled parts, however, has not been consistently resolved. A factor in the choice of crack-inhibiting additives is the additives must not have a substantial adverse effect on the mechanical, physical or chemical properties of the molded article and must not, as a rule, significantly decrease the melt flow rate of the molding compositions.

It is therefore an object of the invention to provide poly(arylene sulfide) molding compositions. It is a further object of the invention to provide fiber-reinforced-poly(arylene sulfide) molding compositions. It is also an objective of the invention to provide poly(arylene sulfide) molded articles having improved cracking resistance.

SUMMARY OF THE INVENTION

According to the invention a composition is provided comprising a poly(arylene sulfide), a sulfone polymer and a reinforcing material such as glass fibers. The relative amounts are those effective to produce a moldable composition. Such a composition will generally contain about 16 to about 45 weight percent of the sulfone polymer, and about 25 to about 60 weight percent of the reinforcing material. The invention compositions ar useful as molding compositions for thick-walled articles.

DETAILED DESCRIPTION OF THE INVENTION

The inventive composition contains an arylene sulfide polymer. There are various types and grades of arylene sulfide polymers which are suitable for use in the invention, the choice of which will depend upon the desired end use of the composition. A reinforced poly(arylene sulfide) molding composition will generally contain from about 16 to about 45, preferably from about 20 to about 30, weight percent poly(arylene sulfide), based on the total weight of the composition.

For use in reinforced molding compositions, the preferred poly(arylene sulfide)s are polyphenylene sulfides, PPS, having recurring phenylene sulfide units, and most preferred are poly(p-phenylene sulfide)s having at least 50 mole percent of the recurring p-phenylene sulfide units with only hydrogen atoms present on the phenylene ring and having been made by the optional addition of a minor amount of a polyhalobenzene compound having more than two halogen substituents per molecule to the polymerization mixture. Even more preferred are poly (phenylene sulfide)s containing at least 90 mole percent of unsubstituted phenylene units and having a melt flow rate of less than 400 g/10 minutes, as measured by ASTM D-1238, Procedure B using a 5 kg weight at 600° F. through a 0.0825 inch diameter orifice and an inherent viscosity greater than 0.25 dl/g at 206° C. in 1-chloronaphthalene with 0.4 g polymer per 100 ml solution using a Cannon-Fenske No. 50 viscometer built into a tetrahydronaphthalene vapor bath that maintains the measurement temperature. Such poly(p-phenylene sulfide)s can be prepared according to the process of U.S. Pat. No. 3,919,177 or 4,038,262 or 4,282,347, incorporated herewith by reference, with optional minor amount of a branching agent such as trichlorobenzene to achieve the desired melt flow rate. Highly suitable poly(arylene sulfide)s are commercially available as RYTON ® polyphenylene sulfide (PPS) resins (Phillips Petroleum Company) of melt flow rate from about 50 to about 700 g/10 minutes as desired.

The inventive compositions contain a sulfone polymer, preferably an aromatic polysulfone (PSO) containing at least one recurring aliphatic group in the polymer chain such as those similar to and referred to by Johnson as bisphenol A-derived polysulfones in "Encyclopedia of Polymer Science and Technology", Bikales, ed., Vol. 11, 447–463 (Wiley, New York 1969) in contrast to the poly(ether-sulfones) referred to therein. As used herein aromatic polysulfones refers to the related materials of aromatic sulfone polymers, polyarylsulfones, poly(ether-sulfones) and polysulfones. Typical of suitable aromatic polysulfones are those obtained by the reaction of a dihydric phenol of the bis(hydroxyphenyl)alkane type and a 4,4'-dihalodiphenylsulfone. Aromatic polysulfones formed by the reaction of 2,2-bis(4-hydroxyphenyl) propane and 4,4'-dichlorodiphenyl sulfone are most preferred. Aromatic polysulfones of this type have been generally referred to as polysulfones and were available commercially from Union Carbide Corporation under the trademarks UDEL P-1700 and UDEL P-3500, and now may be available from Amoco Chemicals, Marietta, OH. A reinforced poly(arylene sulfide) molding composition will generally contain from about 16 to about 45, preferably from about 20 to about 30, weight percent aromatic polysulfone, based on the total weight of the compositions.

The invention compositions include reinforcing material, such as glass fibers, carbon fibers, asbestos, and aramid fibers. Glass fibers are the preferred reinforcing material. The reinforcing materials will generally make up from about 25 to about 60 weight percent, and preferably from about 30 to about 50 weight percent, based on the total weight of the composition.

The inventive compositions can have a weight ratio of the poly(arylene sulfide) to the aromatic polysulfone, i.e. weight of poly(arylene sulfide) in the total composition divided by the weight of aromatic polysulfone is the total composition, in the range from greater than $\frac{2}{3}$ to less than 3/2. The relative amounts of the two polymeric components in compositions when they are the preferred poly(p-phenylene sulfide)s and the preferred aromatic sulfones are preferably in the range from greater than ⅔ to less than 3/2.

The inventive compositions, optionally, can contain a minor amount of a solid ethylene polymer. The ethylene polymer, where used, will generally be present in the composition in an amount from about 0.1 to about 10 weight percent, based on the total weight of the composition. More preferably the ethylene polymer will make up from about 0.2 to about 5, most preferably from about 0.25 to about 3, weight percent of the composition. Preferred are high-density, solid ethylene polymers having a density of about 0.945 to about 0.980 g/cc, preferably about 0.0955 to about 0.970 g/cc as determined by ASTM D-1505. Even more preferred in a low-density ethylene polymer having a density of about 0.910 to about 0.940 g/cc, preferably about 0.910 to about 0.930 g/cc, as determined by ASTM D-1505. The low-density ethylene polymer is preferably a polymer having a melt index greater than 100 g/10 minutes, most preferably greater than about 400 g/10 minutes. The weight-average molecular weight ($M_W$) of the low-density polyethylene is not critical but will generally range from about 1,000 to about 20,000, with the preferred ethylene polymers having a weight-average molecular weight of about 1,000 to about 5,000.

The composition can contain additional optional components such as mold corrosion inhibitors, pigments, processing aids, and the like. Typically, a preferred composition will contain about 0.5 to about 2 weight percent of a mold corrosion inhibitor such as lithium carbonate or a hydrotalcite; and about 1 to about 3 weight percent of a pigment for example such as Davis Brown 6623 (Mineral Pigments Corp., Beltville, Md.).

Poly(arylene sulfide) molding compositions are evaluated for internal cracking resistance according to the procedure published in *Plastics Engineering*, April 1983, page 38 under the title "Screening Test for PPS Compounds".

The procedure used to prepare and to evaluate the preferred poly(arylene sulfide) compositions containing the preferred aromatic polysulfones and a reinforcing material are described herein.

The following examples describe the manner and process of making and using the invention. This description does not limit nor suggest any limitation on the practice of this invention as claimed.

EXAMPLE 1

The procedure is as follows: A mixture of 858.75 grams high molecular weight polyphenylene sulfide (from Phillips Petroleum Co., melt flow rate 55 grams/10 minutes measured by ASTM D-1238, condition 315/5.0), 1200 grams of ⅛-inch chopped fiber glass (Owens Corning 497AA), 60 grams of pigment (Davis Brown No. 6623), 15 grams of corrosion inhibitor (DHT-4A hydrotalcite, Kyowa Chemical Industry Co., Ltd., Osaka, Japan), 7.5 grams of an ethylene polymer (Phillips Petroleum Co. TR885 high-density polyethylene in fluff form), and 858.75 grams of polysulfone (UDEL P-1700 from Union Carbide Corporation) was dry blended in a plastic bag. The mixture (composition no. 3) was extruded through a Davis Standard Extruder, 1.5 inch, as 343° C. with no die, 80–100 rpm, and air cooled. The extrudate was chopped into small pieces or ground into coarse powder that was dried for 2 hours at 150° C. and then was injection molded at 330° C. in a New Britain injection molding machine using a mold cavity temperature of 38° C. to form disks 2.5 inches in diameter by 0.5 inch thick.

After a total of 18 disks have been molded and cooled to room temperature, 8 of the disks were cut in half parallel to the face to 0.25 inch thickness and visually examined for cracks. The cut disks were then annealed for two hours at 400° F. A second set of 8 whole disks was annealed for two hours at 400° F. After cooling, this second set of disks was cut circumferentially as before. All samples were then rated for cracking 48 hours after annealing. The number of disks that show cracks are counted and that number is reported.

The procedure was repeated in runs using compositions comprising polyphenylene sulfides of various grades and types, various aromatic polysulfones and various reinforcing materials. The results in Table I for glass fiber reinforced compositions indicate that the most crack-resistant compositions contained equal amounts of polyphenylene sulfide and the aromatic polysulfone UDEL P-1700 (compositions number 3 and 5). Compositions number 1 and 4 containing no aromatic polysulfone were control runs on two different types of high molecular weight PPS. Composition number 2 containing a poly(ether-sulfone), VICTREX 300 P, has a crack resistance poorer than the PPS control.

EXAMPLE 2

A composition similar to that of number 3 in Example 1 was prepared wherein a low molecular weight polyphenylene sulfide that was cured in air to a melt flow rate of 177 g/10 min that within the preferred range was substituted for the high molecular weight polyphenylene sulfide. The cracking resistance was no better than the control, in fact, all disks showed cracking. No corrosion inhibitor was present.

EXAMPLE 3

The use of carbon fibers as the reinforcing material was evaluated in a composition comprising 34.5 weight percent high molecular weight polyphenylene sulfide, 34.5 weight percent UDEL P-1700 aromatic polysulfone, 1 weight percent lithium carbonate as corrosion inhibitor and 30 weight percent chopped carbon fiber (STACKPOLE CF-30). All 16 disks cracked on both sides upon removal from the mold. The cracking test was terminated with this observation.

EXAMPLE 4

The data on compositions number 1, 2 and 3 of Example 1 demonstrate that the presence of aromatic polysulfone in the preferred range does not significantly alter the measured properties (Table II). The physical properties of the glass fiber-reinforced polyphenylene sulfide compositions were measured on ASTM test bars that were prepared on an Arburg model 221E/150 (Polymer Machinery Corporation, Berlin, Conn.) at a mold temperature of 135° C. nozzle and barrel temperature at 330° C. (PPS) and at 355° C. (PPS/PSO).

The test bars of the polyphenylene sulfide compositions were heated for 2 hours at 204° C. and cooled to ambient room temperature before the measurements were made. The chemical resistance evaluations were made on test bars that were prepared without the heating step.

TABLE I

Effect of Aromatic Polysulfone on Crack Resistance of Molded Glass Fiber Reinforced Polyphenylene Sulfide Compositions

|  | 1 | 2 | 3 | 4 | 5 |
|---|---|---|---|---|---|
| A. Composition, Wt. % |  |  |  |  |  |
| PPS | 56.75[a] | 28.63[a] | 28.63[a] | 56.75[b] | 28.48[b] |
| PSO | — | 28.63[c] | 28.63[d] | — | 28.48[d] |
| Fiber Glass[e] | 40 | 40 | 40 | 40 | 39.8 |
| Other Components | 3.25[f] | 2.75[g] | 2.75[g] | 3.25[f] | 3.25[f] |
| B. Cracking Resistance[h] |  |  |  |  |  |
| Initial | 3 | 8 | 0 | 8 | 0 |
| After 70 hr. | 5 | 11 | 0 | 8 | 0 |

[a]High molecular weight PPS, melt flow rate 55 g/10 min, available from Phillips Petroleum Company.
[b]High molecular weight PPS, melt flow rate 183 g/10 min, available from Phillips Petroleum Company.
[c]Aromatic polysulfone, a poly(ether-sulfone) VICTREX 300P, available from Imperial Chemicals Industries, Ltd.
[d]Aromatic polysulfone UDEL P-1700 from Union Carbide Corporation.
[e]Owens Corning OC 497AA, chopped fiber glass, ⅛-inch.
[f]Pigment 2 wt. %, corrosion inhibitor 1 wt. %, high-density polyethylene 0.25 wt. %.
[g]Pigment 2 wt. %, corrosion inhibitor 0.5 wt. %, high-density polyethylene 0.25 wt. %.
[h]Number of disks cracked out of sixteen tested.

TABLE II

Physical Properties of Molded Glass Fiber Reinforced Polyphenylene Sulfide Compositions

| COMPOSITION | 1 | 2 | 3 |
|---|---|---|---|
| Flexural Modulus[a], MPa | 11496 | 11621 | 11130 |
| Flexural Strength[a], MPa | 153 | 149 | 158 |
| Tensile Strength (Break)[b], MPa | 121 | 123 | 126 |
| Tensile Elongation to Break[b], % | 1.0 | 1.0 | 1.1 |
| Izod Impact Strength[c] |  |  |  |
| Notched, J/M | 57.7 | 53.3 | 53.6 |
| Unnotched, J/M | 270 | 218 | 277 |
| Heat Distortion Temperature[d], °F. | 236 | 216 | 183 |
| Hydrolytic Stability[e], Retention of Tensile Strength, % | 62.7 | 60.9 | 62.2 |
| Chemical Resistance % |  |  |  |
| Methylethylketone | 51.2 | 95.0 | 11.0 |
| 1,2-Dichloroethane | 30.6 | 14.3 | 21.9 |

[a]ASTM D-790
[b]ASTM D-638
[c]ASTM D-256
[d]ASTM D-648
[e]Retained tensile strength expressed as percentage after 5 hours in water at 120° C.
[f]Retained tensile strength expressed as percentage after 2 weeks in chemical at 200° F.

That which is claimed is:

1. A method for improving the crack resistance of a thick-walled molded article prepared from a poly(arylene sulfide) molding composition, the method comprising incorporating a sulfone polymer having at least one recurring aliphatic group in the polymer backbone in a molding composition comprising poly(arylene sulfide) and a glass fiber reinforcing material.

2. The method of claim 1 wherein the poly(arylene sulfide) is a polyphenylene sulfide of high molecular weight having an inherent viscosity 0.25 dl/g or greater and a melt flow rate within the range from about 50 to about 700 grams per 10 minutes and the sulfone polymer is derived from the reaction of 2,2-bis(4-hydroxyphenyl)propane and 4,4'-dichlorodiphenylsulfone.

3. The method of claim 1 wherein the poly(arylene sulfide) is present in an amount of about 20 to about 30 weight percent, the sulfone polymer is present in an amount of about 20 to about 30 weight percent and the glass fiber reinforcing material to present in an amount of about 30 to about 50 weight percent, based on the weight of the composition.

4. The method of claim 1 wherein the poly(arylene sulfide) molding composition comprises from about 0.1 to about 10 weight percent of an ethylene polymer having a density in the range of about 0.910 to about 0.940 g/cc and a melt index of greater than about 100g/10 minutes.

5. A thick-walled molded article having improved crack resistance comprising poly(arylene sulfide), sulfone polymer having at least one recurring aliphatic group in the polymer backbone, and glass fiber reinforcing material.

6. The article of claim 5 wherein poly(arylene sulfide) is polyphenylene sulfide of high molecular weight having an inherent viscosity 0.25 dl/g or greater and a melt flow rate within the range from about 50 to about 700 grams per 10 minutes and sulfone polymer is derived from the reaction of 2,2-bis(4-hydroxyphenyl)propane and 4,4'-dichlorodiphenylsulfone.

7. The article of claim 5 wherein poly(arylene sulfide) is present in an amount of about 20 to about 30 weight percent, sulfone polymer is present in an amount of about 20 to about 30 weight percent and glass fiber reinforcing material to present in an amount of about 30 to about 50 weight percent, based on the weight of the composition.

8. The article of claim 5 further containing from about 0.1 to about 10 weight percent of an ethylene polymer having a density in the range of about 0.910 to about 0.940 g/cc and a melt index of greater than about 100g/10 minutes.

9. A thick-walled molded article consisting of polyphenylene sulfide of high molecular weight present in an amount from about 16 to about 45 weight percent, polysulfone containing an aliphatic group in the polymer chain present in an amount from about 16 to about 45 weight percent, and glass fibers present in an amount from about 25 to about 60 weight percent, each weight percent based on the total composition and the weight ratio of said polyphenylene sulfide to said polysulfone being in the range from greater than ⅔ to less than 3/2.

10. A thick-walled molded article consisting of polyphenylene sulfide of high molecular weight present in an amount from about 16 to about 45 weight percent, polysulfone containing an aliphatic group in the polymer chain present in an amount from about 16 to about 45 weight percent, ethylene polymer having a density of about 0.910 to about 0.940 g/cc and a melt index of greater than about 100g/10 minutes present in an amount from about 0.1 to about 10 weight percent, and glass fibers present in an amount from about 25 to about 60 weight percent, each weight percent based on the total composition and the weight ratio of said polyphenylene sulfide to said polysulfone being in the range from greater than ⅔ to less than 3/2.

11. A method for improving the internal crack resistance of a thick-walled molded article prepared from a poly(arylene sulfide) molding composition, the method consisting of incorporating in a molding composition sulfone polymer having at least one recurring aliphatic group in the sulfone polymer backbone, high molecular weight polyphenylene sulfide having an inherent viscosity 0.25 dl/g or greater and a melt flow rate within the range from about 50 to about 700 grams per 10 minutes, and glass fibrous reinforcing material, the weight ratio of said polyphenylene sulfide to said sulfone polymer being in the range from greater than ⅔ to less than 3/2 and glass fibers being present in an amount of each 30 to about 50 weight percent based on the weight of the composition.

12. A thick-walled molded article having improved internal crack resistance comprising poly(arylene sulfide), sulfone polymer having at least one recurring aliphatic group in the polymer backbone, and glass fiber reinforcing material, a portion of said article having a thickness of at least 0.5 inch.

13. The article of claim 7 wherein a portion of said article has a thickness of at least 0.5 inch.

* * * * *